US012307923B2

(12) United States Patent
Clark

(10) Patent No.: US 12,307,923 B2
(45) Date of Patent: May 20, 2025

(54) BACKLIT SIGNAGE DISPLAY SYSTEM

(71) Applicant: Paula Clark, Southfield, MI (US)

(72) Inventor: Paula Clark, Southfield, MI (US)

( * ) Notice: Subject to any disclaimer, the term of this patent is extended or adjusted under 35 U.S.C. 154(b) by 104 days.

(21) Appl. No.: 17/590,003

(22) Filed: Feb. 1, 2022

(65) Prior Publication Data

US 2023/0245601 A1 Aug. 3, 2023

(51) Int. Cl.

*G09F 13/04* (2006.01)
*G09F 13/22* (2006.01)
*G09F 13/34* (2006.01)

(52) U.S. Cl.

CPC ...... *G09F 13/0468* (2021.05); *G09F 13/0413* (2013.01); *G09F 13/34* (2013.01); *G09F 2013/222* (2013.01)

(58) Field of Classification Search

CPC .. G09F 13/0468; G09F 13/0413; G09F 13/34; G09F 2013/222; G09F 9/301; G09F 2011/0009; G09F 2011/0027; G06F 1/1652

See application file for complete search history.

(56) References Cited

U.S. PATENT DOCUMENTS 790,696 A * 5/1905 Long ....................... G09F 13/34 40/459
924,416 A * 6/1909 Beile ..................... G09F 11/325 40/516
3,497,979 A * 3/1970 Buitkus ................... G09F 19/12 40/431
4,078,492 A * 3/1978 Levy ......................... E06B 9/13 160/264
5,979,093 A * 11/1999 Harruff ................... G09F 11/29 40/518
2001/0042603 A1* 11/2001 Shimizu .................... G09F 7/22 160/121.1
2010/0300631 A1* 12/2010 Sullivan .................. G09F 11/23 160/405
2010/0302772 A1* 12/2010 Lin ......................... G09F 23/06 362/249.02
2013/0145661 A1* 6/2013 Elliott ..................... A63J 25/00 40/582
2018/0361831 A1* 12/2018 Buttolo .................. B60J 1/2041
2019/0007662 A1* 1/2019 Niedermeyer ............ F21S 4/28
2019/0316756 A1* 10/2019 Probst ................... F21V 31/005
2019/0326718 A1* 10/2019 Zhang ................... G06F 1/1652
(Continued)

*Primary Examiner* — David R Dunn
*Assistant Examiner* — Christopher E Veraa
(74) *Attorney, Agent, or Firm* — MaxGoLaw PLLC

(57) ABSTRACT

A signage display system configured to be mounted to a surface and to support an interchangeable display panel and provide backlighting thereto. A pair of brackets mount the system to a surface or a frame which in turn is mounted to a surface, such as a door using a pair of over-door hooks. A lighting unit is configured to be rotatably mounted to the brackets, the lighting unit having a plurality of light sources. A display unit is configured to be rotatably mounted to the brackets, the display unit including an interchangeable display panel having indicia for display provided thereon that is configured to be backlit by the light sources of the lighting unit. The system configured to easily roll up the lighting unit and the display unit for easy removal from the system, storage, transportation, to simply to access the surface on which the system is mounted.

20 Claims, 3 Drawing Sheets

(56) References Cited

U.S. PATENT DOCUMENTS

| | | | | |
|---|---|---|---|---|
| 2020/0035133 | A1* | 1/2020 | Pyo | F16M 13/02 |
| 2020/0312202 | A1* | 10/2020 | Miller | G09F 15/0062 |
| 2021/0068280 | A1* | 3/2021 | Han | G06F 1/1652 |
| 2021/0272484 | A1* | 9/2021 | Pyo | G06F 1/1624 |
| 2021/0363822 | A1* | 11/2021 | Blair | H02K 11/33 |
| 2022/0066288 | A1* | 3/2022 | Christensen | B65H 75/30 |
| 2022/0139275 | A1* | 5/2022 | Pyo | G06F 1/1652<br>361/679.01 |
| 2023/0004189 | A1* | 1/2023 | Luo | G06F 1/1656 |
| 2023/0089831 | A1* | 3/2023 | Li | G09F 9/301<br>361/679.01 |

* cited by examiner

BACKLIT SIGNAGE DISPLAY SYSTEM

FIELD OF THE INVENTION

The present invention relates to signage displays. More particularly, it relates to backlit interchangeable, bendable signage displays.

BACKGROUND OF THE INVENTION

Out-of-home advertising and signage represents a significant and growing segment of annual overall commercial media spending. In order to catch and hold the attention of consumers, out-of-home advertising relies on attractive, eye-catching imagery and text. To be effective, the imagery and text must be visible in a variety of lighting conditions, such as well-lit day time conditions as well as poorly lit indoor conditions conditioned and times of darkness.

Illumination may be applied to advertising indicia, that is, itself, a passive display to illuminate the display to attract the attention of the observer and to make the imagery and text visible in poorly lit conditions, such as indoors or in times of darkness. Additionally, illuminated shop/business front signs may be used to attract the attention of passers-by and to make an entrance more visible during the hours of darkness. This is particularly effective for businesses that predominantly operate at night, such as bars, restaurants and nightclubs. Such lighting displays are usually illuminated continuously for extended periods of time, thus a display that is inexpensive to power is desirable.

Two types of illuminated advertising systems include front lighting illumination systems and backlighting illumination systems displays. Front lighting illumination systems include incandescent and halogen lamps, as well as light emitting diode (LED) arrays mounted in front of the advertising indicia to shine light on the front of the display. The viewer sees the advertising image by this reflected light. Backlighting illumination systems include fluorescent lights and LED arrays mounted behind the advertising indicia, which is printed with translucent inks on translucent materials that let the light pass through the display directly to the viewer.

Each of the illumination systems possesses disadvantages such as energy consumption, heat generation, fragility, and maintenance cost (due, in part, to bulb/ballast replacement and maintenance). These illumination sources also pose challenges for advertising device designers and installers because the light bulbs, sockets, frames, and mounting hardware are large, heavy and rigid.

Existing advertising displays also pose challenges for designers and installers given that the displays are often temporary and require being changed regularly to keep up with the latest items, deals, and seasons.

Thus, there exists a need for an easily adaptable signage display system that provides high visibility in a variety of lighting conditions, that is easy and inexpensive to operate, and that easily accommodates frequent changing of signage for display.

SUMMARY OF THE INVENTION

The present invention provides an inventive signage display system that includes a mounting assembly configured to be mounted to a surface and to support an interchangeable display panel and provide backlighting thereto. The mounting assembly of the inventive signage display system includes a pair of brackets configured to be mounted to a surface or mounted to a frame which is in turn configured to be mounted to a surface. According to embodiments, the mounting assembly is configured to be mounted to a door using a pair of over-door hooks, so that the system may be installed without tools and without modification to the surface to which the system is mounted. The system additionally includes a lighting unit including a first tube and a light panel extending therefrom, the first tube having a first end and a second end each configured to be rotatably mounted to one of the first bracket and the second bracket, respectively. The light panel having a plurality of light sources disposed thereon, in electrical communication with a power source. The system additionally includes a display unit including a second tube and a display panel extending therefrom, the second tube having a first end and a second end each configured to be rotatably mounted to one of the first bracket and the second bracket, respectively. The display panel having indicia for display provided thereon that are configured to be backlit by the light sources of the light panel. According to embodiments, the light panel and the display panel are provided on the same tube.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

Figure 1:
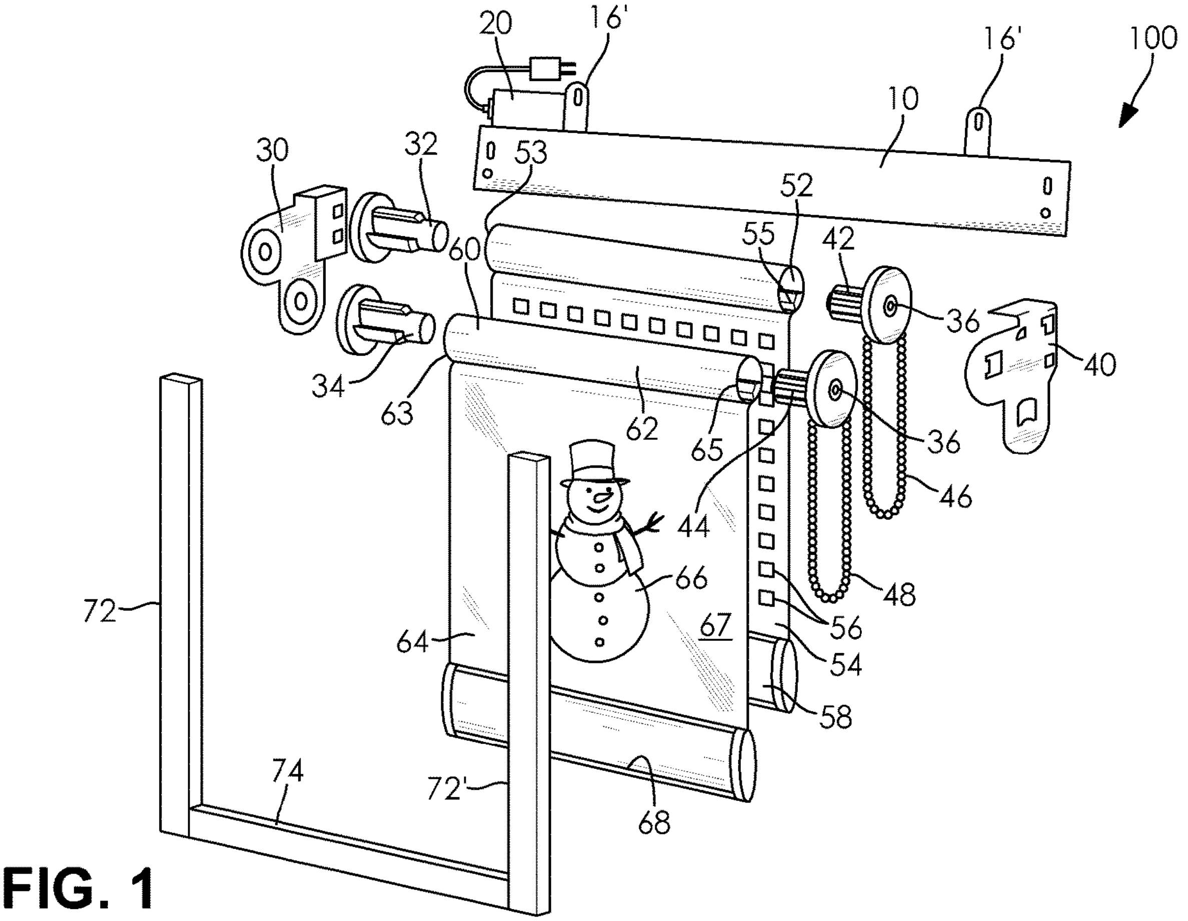
FIG. 1 shows an exploded perspective view of an inventive signage display system according to embodiments of the present disclosure.

The present invention has utility as a signage display system that is easily adaptable, provides high visibility in a variety of lighting conditions, is easy and inexpensive to operate, and easily accommodates frequent changing of signage for display. The present invention additionally has utility as a signage display system for backlit display of interchangeable, bendable signage displays. The present invention additionally has utility as a signage display system that is easily mounted on vertical surfaces such as doors, windows, billboards, and sign structures.

The present invention will now be described with reference to the following embodiments. As is apparent by these descriptions, this invention can be embodied in different forms and should not be construed as limited to the embodiments set forth herein. Rather, these embodiments are provided so that this disclosure will be thorough and complete, and will fully convey the scope of the invention to those skilled in the art. For example, features illustrated with respect to one embodiment can be incorporated into other embodiments, and features illustrated with respect to a particular embodiment may be deleted from the embodiment. In addition, numerous variations and additions to the embodiments suggested herein will be apparent to those skilled in the art in light of the instant disclosure, which do not depart from the instant invention. Hence, the following specification is intended to illustrate some particular embodiments of the invention, and not to exhaustively specify all permutations, combinations, and variations thereof.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Unless indicated otherwise, explicitly or by context, the following terms are used herein as set forth below.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

According to embodiments an inventive signage display system 100 of the present invention includes a mounting assembly configured to be mounted to a surface and to support an interchangeable display panel and provide backlighting thereto.

Figure 2:
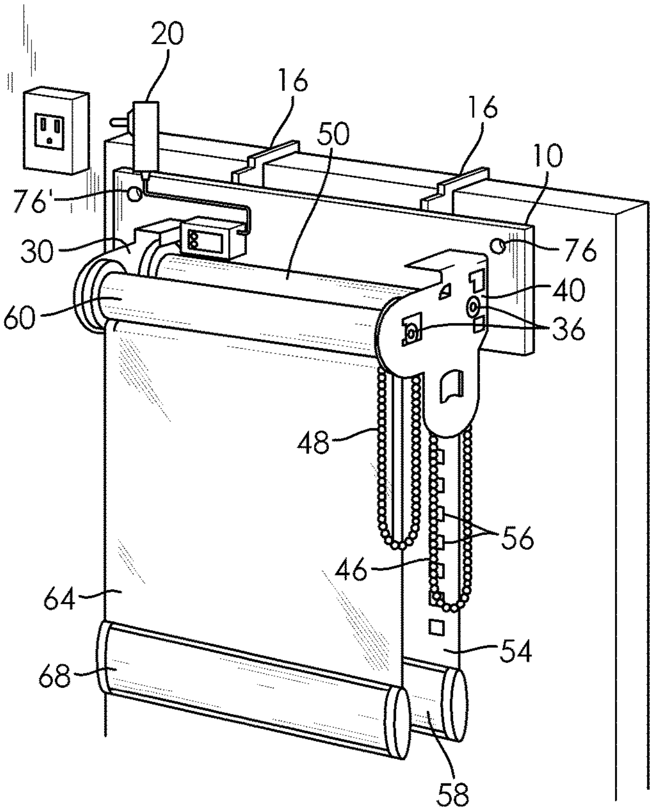
FIG. 2 shows an assembled perspective view of an inventive signage display system of according to embodiments of the present disclosure.
Figure 3:
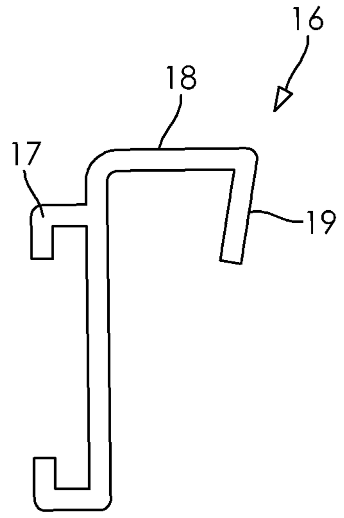
FIG. 3 shows a side view of a hook for mounting an inventive signage display system according to embodiments of the present disclosure.
Figure 4:
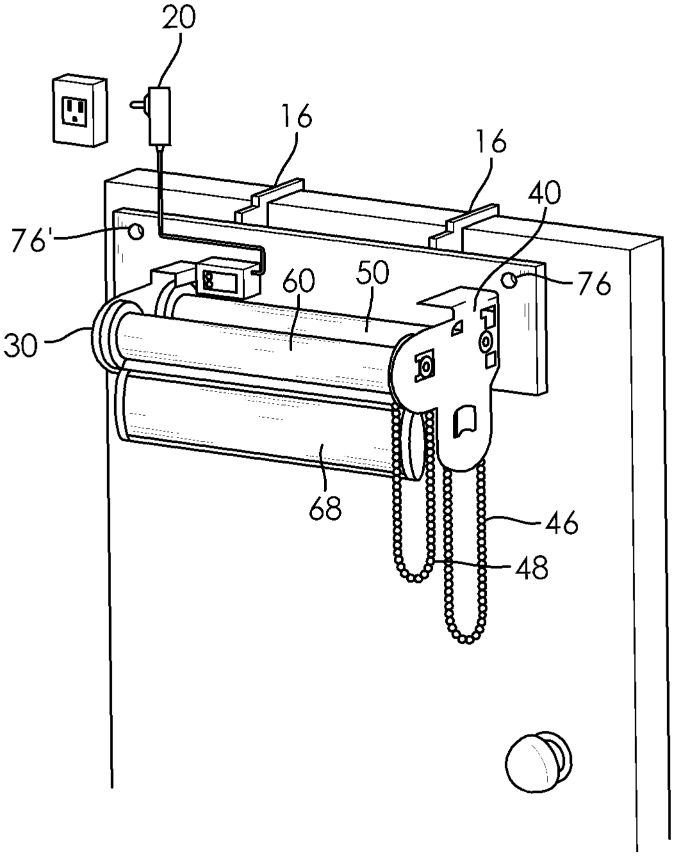
FIG. 4 shows the inventive signage display system of FIG. 2 installed on a door in a retracted position.

According to embodiments, the mounting assembly includes a first bracket 30 and a second bracket 40 that are configured to be mounted to a surface. The surface to which the brackets 30, 40 are mounted may illustratively be a wall, a residential door, a door frame, a garage door, a window, and window frame, a ceiling, a billboard, a sign structure, or any other suitable surface where it is desired to provide an illuminated advertisement, sign, or display. According to such embodiments, the brackets 30, 40 are mounted to a surface using a plurality of fasteners, such as screws, bolts, nails, hooks, clamps, or the like. According to embodiments, the mounting assembly additionally includes a frame 10 to which the brackets 30, 40 are attached and extend therefrom. The frame 10 providing extra stability and rigidity to the system 100. According to such embodiments, the frame 10 is configured to be mounted to a surface such as a wall, a residential door, a door frame, a garage door, a window, and window frame, a ceiling, a billboard, a sign structure, or any other suitable surface where it is desired to provide an illuminated advertisement, sign, or display. According to such embodiments, the frame is mounted to a surface using a plurality of fasteners, such as screws, bolts, nails, hooks, clamps, or the like. Advantageously, when the mounting assembly is mounted to a surface using hooks 16, such as the over-door hooks shown in FIG. 4, the inventive signage display system 100 may be easily installed without the use of a tool and without modifying or damaging the surface to which the system 100 is installed. As shown in FIG. 3, hooks 16 include a bracket 17 configured to receive and retain the frame 10, for example by a friction fit, an over-door portion 18, and a door-retaining portion 19. Alternatively, hooks 16', as shown in FIG. 1, may be used in conjunction with a plurality of fasteners to mount the frame 10 to a surface. In still other embodiments, as shown in FIG. 2, through holes 76 and 76" are provided to mount the frame 10 with fasteners (not shown) to a substrate such as a door.

According to embodiments, the signage display system 100 includes a lighting unit 50. The lighting unit 50 includes a plurality of light sources 56 that are configured to be in electrical communication with a power source 20. According to embodiments the light sources 56 include an array of planar LED lights, a cold cathode ray tube, an electroluminescent display, or a fiber optic lighting system. The lighting unit 50 is configured to extend from the mounting brackets 30, 40 so that the light sources 56 are spread out to cover an area to be illuminated. According to embodiments, the lighting unit 50 is waterproof and weatherproof. According to embodiments, the light sources 56 are embedded within a plastic material to protect the light sources 56 from the elements and from being damaged. According to embodiments, the lighting unit 50 includes a filter layer configured to be positioned between the light panel 54 and the display panel 64. The filter layer configured to disperse the light emitted from the light sources 56, thereby preventing bright spots and non-uniform light from appearing on the display panel 64.

According to embodiments, the lighting unit 50 includes a first tube 52 and a light panel 54 extending therefrom, on which the light sources 56 are disposed. The first tube 52 has a first end 53 and a second end 55 each configured to be mounted to one of the first bracket 30 and the second bracket 40, respectively. According to embodiments, the first tube 52 is configured to be rotatably mounted to the brackets 30, 40. According to embodiments, the first bracket 30 includes a first mounting plug 32 and the second bracket 40 includes a second mounting plug 42, with each of the mounting plugs 32, 42 configured to be inserted into the ends 53, 55 of the first tube 52 of the lighting unit 50 to rotatably mount the lighting unit 50 to the first and second brackets 30, 40. According to embodiments, one of the first mounting plug 32 and the second mounting plug 42 includes a pull chain 46 configured to actuate rotation thereof. According to embodiments, the pull chain 46 is configured to be actuated by hand. According to embodiments, at least one of the mounting plugs 32, 42 is releasably attached to a mounting bracket 30, 40 by a spring-loaded button 36 provided on the mounting plug. The spring-loaded button 36 is configured to protrude through a hole provided in the associated mounting bracket 30, 40. The spring-loaded button 36 is easily actuated by a user to disengage a mounting plug 32, 42, from a mounting bracket 30, 40.

In some inventive embodiments, as shown in FIG. 1, the frame 10 is complemented around the display panel 64 by joining opposing vertical slats 72, 72' in turn joined to a bottom slat 74. The slats function to protect the display panel 64 from undue buffeting by wind and other environmental exposures.

According to embodiments, the light panel 54 is flexible and configured to be wrapped around the first tube 52 in a retracted position. According to embodiments, pulling the pull chain 46 actuates the rotation of the first tube, thereby causing the light panel 54 to wrap around the first tube 52. The retracted position with the light panel 54 wrapped around the first tube, allows for the light panel 54 to be easily and safely stored, removed from the system 100, and transported. Such a retracted position also enables one to uncover the surface on which the system 100 is mounted without needing to completely remove the lighting unit 50 or the entire system 100. This may be particularly useful when the system is mounted to a door, door frame, window, or window frame, and a user wishes to access the door or window.

According to embodiments, a rail 58 is provided along an edge of the lighting panel 54 opposite the first tube 52. The rail 58 is configured to hold the light panel 54 in a deployed positioned. According to embodiments, the rial 58 is weighted and holds the light panel 54 in a deployed position using gravity. According to embodiments, the rail 58 is configured to be attached to a surface.

The display panel 64 of the inventive signage display system 100 is provided with indicia 66 for display. According to embodiments, the display panel 64 is positioned relative to the lighting panel 54 such that the indicia 66 for display faces away from the light panel 54, so that the light emitted from the light sources 56 provide backlighting to the indicia 66 for display. According to embodiments, the display panel 64 is a cloth material with the indicia 66 for display printed thereon. According to embodiments, the display panel 64 is translucent so that light from the light sources 56 may be shown through the display panel 64, thereby backlighting the display panel 64.

According to embodiments, the display panel 64 is provided as part of a display unit 60 that includes a second tube 62 from which the display panel 64 extends. The second tube 62 has a first end 63 and a second end 65 each configured to be mounted to one of the first bracket 30 and the second bracket 40, respectively. According to embodiments, the second tube 62 is configured to be rotatably mounted to the brackets 30, 40. According to embodiments, the first bracket 30 includes a third mounting plug 34 and the second bracket 40 includes a fourth mounting plug 44, each of the mounting plugs 34, 44 configured to be inserted into the ends 63, 65 of the second tube 62 of the display unit 60 to rotatably mount the display unit 60 to the first and second brackets 30, 40. According to embodiments, one of the third mounting plug 34 and the fourth mounting plug 44 includes a pull chain 48 configured to actuate rotation thereof. According to embodiments, the pull chain 48 is configured to be actuated by hand. According to embodiments, at least one of the mounting plugs 34, 44 is releasably attached to a mounting bracket 30, 40 by a spring-loaded button 36 provided on the mounting plug. The spring-loaded button 36 is configured to protrude through a hole provided in the associated mounting bracket 30, 40. The spring-loaded button 36 is easily actuated by a user to disengage a mounting plug 34, 44, from a mounting bracket 30, 40.

According to embodiments, the display panel 64 is flexible and configured to be wrapped around the second tube 62 in a retracted position for easy storage and transport. According to embodiments, pulling the pull chain 48 actuates the rotation of the second tube 62, thereby causing the display panel 64 to wrap around the second tube 62. The retracted position with the display panel 64 wrapped around the second tube 62, allows for the display panel 64 to be easily and safely stored, removed from the system 100, and transported. Such a retracted position also enables one to uncover the surface on which the system 100 is mounted without needing to completely remove the display unit 60 or the entire system 100. This may be particularly useful when the system is mounted to a door, door frame, window, or window frame, and a user wishes to access the door or window.

According to embodiments, a rail 68 is provided along an edge of the display panel 64 opposite the second tube 62. The rail 68 is configured to hold the display panel 64 in a deployed position. According to embodiments, the rial 68 is weighted and holds the display panel 64 in a deployed position using gravity. According to embodiments, the rail 68 is configured to be attached to a surface.

According to embodiments, the display unit 60 additionally includes a protective layer 67 that is configured to cover the display panel 64. According to embodiments the protective layer 67 is transparent. According to embodiments, the protective layer 67 is a plastic material. According to embodiments, the display panel 64 is removable from the inventive signage display system 100 so that the display panel 64 may be easily swapped with a display panel 64 having different indicia 66 provided thereon.

According to embodiments, the light panel 54 and the display panel 64 are incorporated into a single lighting and display unit. According to such embodiments, the light panel 54 and the display panel 64 extend from the same tube, which has ends as described above and mounts to the brackets 30, 40, as described above. Additional features of the lighting unit 50 and display unit 60, described above, are also provided in the combined lighting and display unit, according to embodiments.

According to embodiments, the power source 20 is an AC adaptor configured to be plugged in to a standard outlet. According to embodiments, the power source 20 is a battery pack. According to embodiments, the power source, includes a functionality light to show if the display system 100 is receiving power. According to embodiments, the power source 20 is controlled by a remote.

Figure 5:
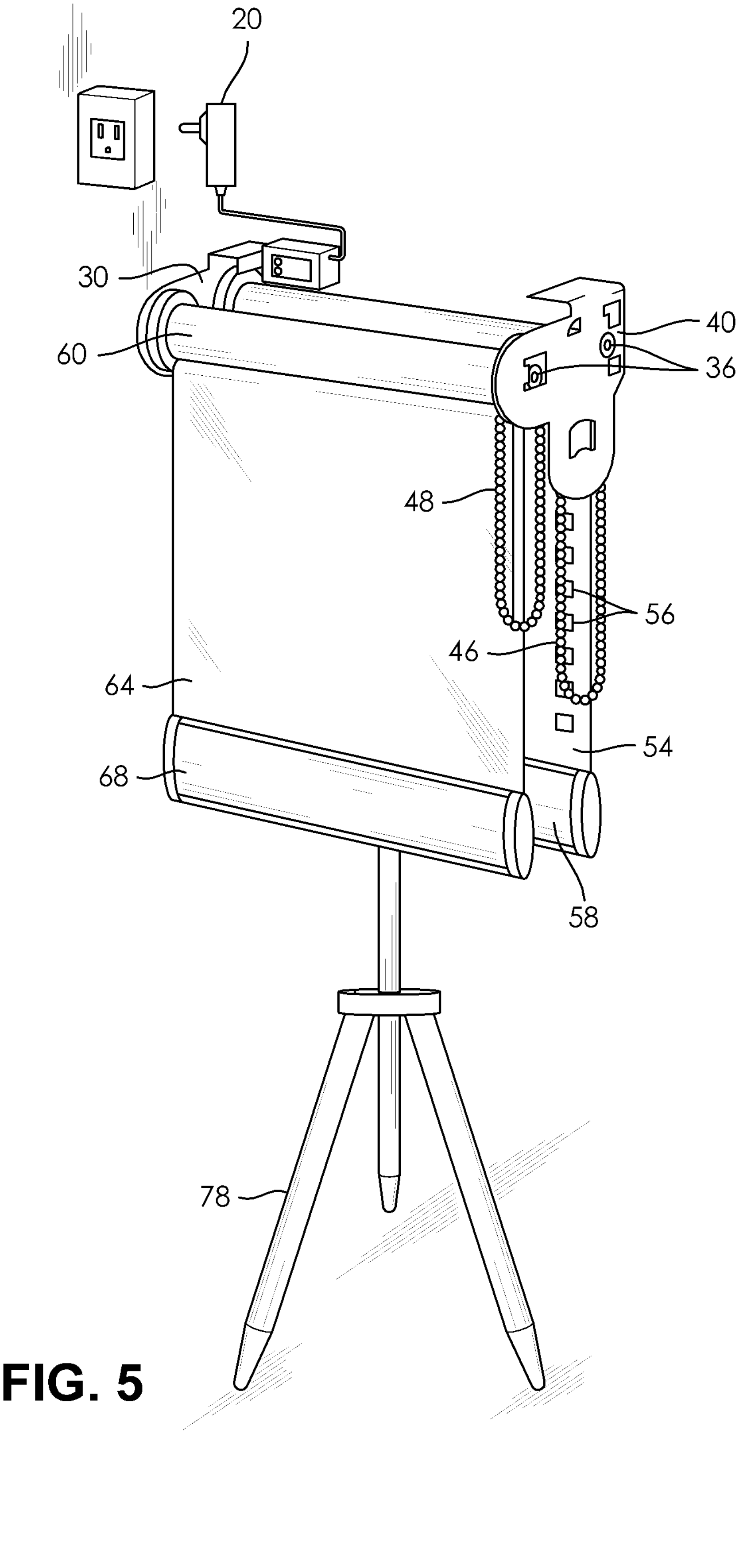
FIG. 5 shows an inventive signage system in the context of a stand.

As shown in FIG. 5 in which like numerals have the meanings ascribed thereto with respect to the aforementioned drawings, is mounted on a stand 78 to provide a freestanding embodiment such as a convention stand, a real estate sign, or the like. The stand 78 is depicted as a tripod but it is appreciated that in other embodiments, the stand 78 is a spike or set of poles.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention but is not meant to be a limitation upon the practice thereof. The following claims, including all equivalents thereof, are intended to define the scope of the invention.

The invention claimed is:

1. A signage display system comprising:

a frame;

a first bracket and a second bracket both configured to be mounted to the frame;

a lighting tube having a first end and a second end each configured to be rotatably mounted to one of the first bracket and the second bracket, respectively;

a display tube having a first end and a second end each configured to be rotatably mounted to one of the first bracket and the second bracket, respectively;

a light panel extending from the lighting tube, the light panel having a plurality of light sources disposed thereon, the light sources configured to be in electrical communication with a power source; and a display panel having indicia for display provided thereon, the display panel extending from the display tube and positioned such that the indicia for display faces away from the light panel;

wherein, while the lighting tube and the display tube are mounted to the first bracket and the second bracket, the light panel and the display panel are each separately configured to move between a deployed position where the light panel and the display panel are extended from the lighting tube and the display tube, respectively, and a retracted position where the light panel is wrapped around the light tube and the display panel is wrapped around the display tube; and wherein the light sources of the light panel are configured to backlight the indicia for display on the display panel when the light panel and the display panel are both in the deployed position.

2. The signage display system of claim 1 wherein the first bracket includes a first set of mounting plugs and the second bracket includes a second set of mounting plugs, each of the mounting plugs configured to be inserted into one of the ends of one of the lighting tube and the display tube to rotatably mount the lighting tube and the display tube to the first and second brackets.

3. The signage display system of claim 2 wherein one of the first set of mounting plugs and the second set of mounting plugs includes a pull chain configured to actuate rotation thereof.

4. The signage display system of claim 1 further comprising a first rail provided on the light panel opposite the lighting tube.

5. The signage display system of claim 4 wherein the first rail is configured to hold the light panel in the deployed position.

6. The signage display system of claim 4 further comprising a second rail provided on the display panel opposite the display tube.

7. The signage display system of claim 6 wherein the second rail is configured to hold the display panel in the deployed position.

8. The signage display system of claim 1 wherein the light panel and the display panel are flexible and configured to be wrapped around the lighting tube and the display tube, respectively, in the retracted position.

9. The signage display system of claim 1 wherein the light sources disposed on the light panel are any of an array of planar LED lights, a cold cathode ray tube, an electroluminescent display, and a fiber optic lighting system.

10. The signage display system of claim 1 wherein the display panel is a cloth material.

11. The signage display system of claim 1 wherein the display panel is translucent.

12. The signage display system of claim 1 further comprising a protective layer configured to cover the display panel.

13. The signage display system of claim 12 wherein the protective layer is a plastic material.

14. The signage display system of claim 1, wherein the frame is configured to be mounted to a vertical surface.

15. The signage display system of claim 14 wherein the vertical surface being a residential door, a garage door, a billboard, or a stand.

16. A signage display system comprising:

a frame having a first end and a second end, the frame configured to be mounted to a vertical surface;

a power source attached to the frame;

a first bracket extending from the first end of the frame;

a second bracket extending from the second end of the frame;

a lighting unit including a first tube and a light panel extending therefrom, the first tube having a first end and a second end each configured to be rotatably mounted to one of the first bracket and the second bracket, respectively, the light panel having a plurality of light sources disposed thereon, the light sources configured to be in electrical communication with the power source; and a display unit including a second tube and a display panel extending therefrom, the second tube having a first end and a second end each configured to be rotatably mounted to one of the first bracket and the second bracket, respectively, the display panel having indicia for display provided thereon, the display panel mounted parallel to the light panel and separately extendible relative to the light panel; and wherein, while the first tube and the second tube are mounted to the first bracket and the second bracket, the light panel and the display panel are each separately configured to move between a deployed position where the light panel and the display panel are extended from the first tube and the second tube, respectively, and a retracted position where the light panel is wrapped around the first tube and the display panel is wrapped around the second tube; and wherein the light sources of the light panel are configured to backlight the indicia for display on the display panel when the light panel and the display panel are both in the deployed position.

17. The signage display system of claim 16 wherein the first bracket includes a first mounting plug and the second bracket includes a second mounting plug, each of the mounting plugs configured to be inserted into the ends of the first tube of the lighting unit to rotatably mount the lighting unit to the first and second brackets.

18. The signage display system of claim 16 wherein the first bracket includes a third mounting plug and the second bracket includes a fourth mounting plug, each of the mounting plugs configured to be inserted into the ends of the second tube of the display unit to rotatably mount the display unit to the first and second brackets.

19. The signage display system of claim 16 wherein the lighting unit additionally includes a first rail provided on the light panel opposite the first tube.

20. The signage display system of claim 16 wherein the display unit additionally includes a second rail provided on the display panel opposite the second tube.

* * * * *